United States Patent [19]
Hammond et al.

[11] 3,772,522
[45] Nov. 13, 1973

[54] CRYSTAL MONOCHROMATOR AND METHOD OF FABRICATING A DIFFRACTION CRYSTAL EMPLOYED THEREIN

[75] Inventors: Donald L. Hammond, Los Altos Hills, Calif.; Larry V. Knight, Provo, Utah; Henry Yoshida, San Jose, Calif.; Vasalie L. Peickii, deceased, late of San Mateo, Calif. by Jeanette C. Peickii, executrix

[73] Assignee: Hewlett-Packard Company, Palo Alto, Calif.

[22] Filed: Feb. 17, 1972

[21] Appl. No.: 226,577

Related U.S. Application Data

[63] Continuation of Ser. No. 3,000, Jan. 15, 1970, abandoned.

[52] U.S. Cl.............. 250/503, 250/280, 250/305, 250/510
[51] Int. Cl. .......................................... G01n 23/20
[58] Field of Search............. 250/51.5, 53.1, 49.5 A, 250/49.5 PE

[56] References Cited
UNITED STATES PATENTS

| | | |
|---|---|---|
| 2,688,093 | 8/1954 | Dumond ............................ 250/51.5 |
| 2,853,617 | 9/1958 | Berreman .......................... 250/51.5 |
| 2,941,078 | 6/1960 | Montel............................... 250/51.5 |
| 3,397,312 | 8/1968 | Okano ............................... 250/51.5 |

OTHER PUBLICATIONS

"The Esca Method Using Monochromatic X-Rays and a Permanent Magnet Spectrograph" by A. Fahlman et al. From Arkiv For Fysik, Vol. 32, 1966, paper 7, pages 111–114 & 120–121.

"Small-Angle Scattering of X-Rays" by G. Wassberg et al. From Arkiv for Fysik, Vol. 14, paper 1, pages 1–15.

Primary Examiner—William F. Lindquist
Attorney—Roland I. Griffin

[57] ABSTRACT

A crystalline quartz disc capable of diffracting X-radiation at a Bragg angle in the range from fifty to ninety degrees is formed with flat surfaces parallel to its atomic planes. This disc is forced against a spherical surface of a quartz substrate and brazed in place to provide a spherical diffraction crystal with a radius of curvature equal to the diameter of the Rowland circle. A monochromator is provided in which this spherical diffraction crystal monochromatically focuses X-radiation from a source at a point on the Rowland circle onto a target at a conjugate point on the Rowland circle.

10 Claims, 5 Drawing Figures

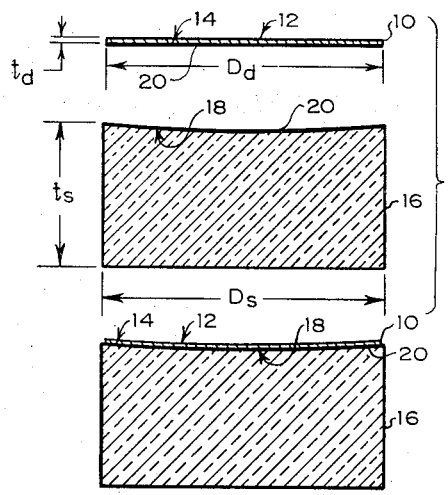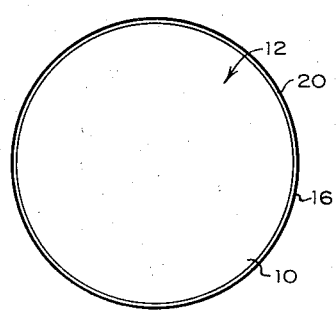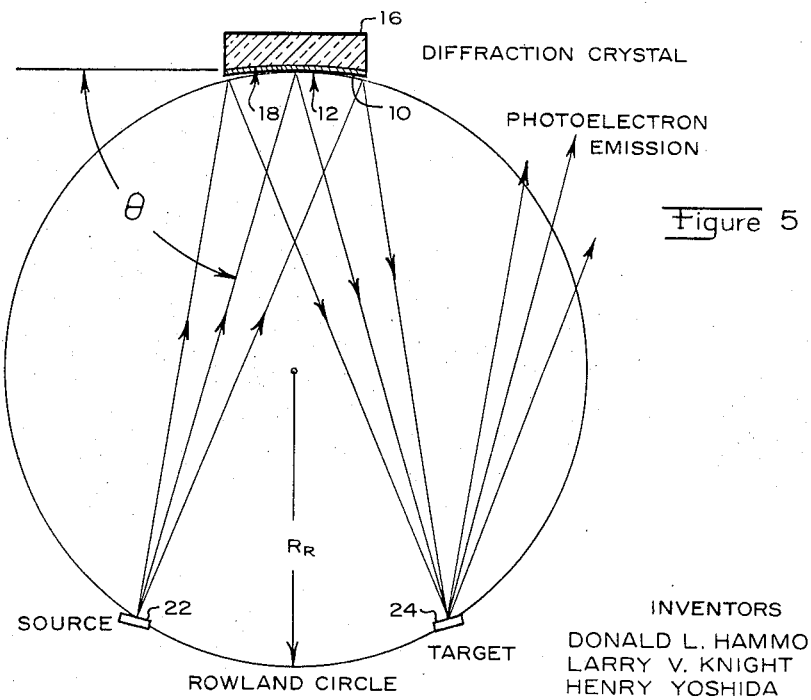

CRYSTAL MONOCHROMATOR AND METHOD OF FABRICATING A DIFFRACTION CRYSTAL EMPLOYED THEREIN

CROSS REFERENCE TO RELATED APPLICATION

This is a continuation of U.S. Pat. Application Ser. No. 3,000, filed Jan. 15, 1970, and now abandoned.

BACKGROUND AND SUMMARY OF THE INVENTION

This invention relates to a point focusing crystal monochromator that may be used in X-ray spectroscopy, in electron spectroscopy for chemical analysis (hereinafter referred to as ESCA), and in other applications requiring monochromatic X-radiation. It also relates to a method of fabricating a point focusing diffraction crystal that may be employed in this crystal monochromator.

Nearly perfect point focusing of X-radiation could be achieved by employing a diffraction crystal having a pair of surfaces parallel to its atomic planes, being ground so that one of these surfaces has a radius of curvature equal to the diameter, $D_R$, of the Rowland circle, and being toroidally bent so that this surface has a radius of curvature equal to the radius, $R_R$, of the Rowland circle in the plane of the Rowland circle and a radius of curvature equal to $D_R \sin^2\theta$ in a perpendicular plane bisecting the Rowland circle, where $\theta$ is the Bragg angle at which X-radiation is diffracted from a point on the Rowland circle by the diffraction cyrstal. A nearly perfect point focusing crystal monochromator could be fabricated by employing this toroidal diffraction crystal to focus X-radiation from a source at a point on the Rowland circle onto a target at a conjugate point on the Rowland circle. However, such a toroidal diffraction crystal would be very difficult to make. A monochromator is typically fabricated by employing a diffraction crystal cylindrically bent in the plane of the Rowland circle with a radius of curvature equal to the diameter of the Rowland circle. Although this cylindrical diffraction crystal is much easier and less expensive to make than a toroidal diffraction crystal would be, it is not capable of point focusing X-radiation with the intensity required in some applications.

Accordingly, the principal object of this invention is to provide a point focusing crystal monochromator employing a diffraction crystal that is simpler and less expensive to fabricate than a toroidal diffraction crystal and that is capable of point focusing X-radiation with an intensity significantly greater than can be achieved by a cylindrical diffraction crystal and approaching what could be achieved by a toroidal diffraction crystal.

Another object of this invention is to provide an improved method of fabricating point-focusing diffraction crystals that may be employed in X-ray monochromators.

These objects are accomplished according to the preferred embodiment of this invention by forming an x-cut crystalline quartz substrate having a spherical surface with a radius of curvature substantially equal to the diameter of the Rowland circle and by forming a thinner y-cut crystalline quartz disc having flat surfaces parallel to its atomic planes and being capable of diffracting X-radiation at a Bragg angle in the range from 50° to 90°. The z axes of the quartz disc and the quartz substrate are aligned, and the quartz disc is then forced against the spherical surface of the quartz substrate and brazed in place to provide a spherical diffraction crystal with a radius of curvature equal to the diameter of the Rowland circle. For Bragg angles in the range from 50° to 90° this spherical diffraction crystal is capable of point focusing X-radiation with a resolution and intensity significantly greater than can be achieved by a conventional cylindrical diffraction crystal. Moreover, as the Bragg angle increases toward ninety degrees, this spherical diffraction crystal is capable of point focusing X-radiation with a resolution and intensity approaching what could be achieved by a toroidal diffraction crystal. A point focusing crystal monochromator is provided in which this spherical diffraction crystal focuses X-radiation from a source at a point on the Rowland circle onto a target at a conjugate point on the Rowland circle.

DESCRIPTION OF THE DRAWING

FIG. 2 is an exploded half sectional elevational view of a spherical diffraction crystal fabricated according to the preferred embodiment of this invention.

FIG. 3 is an assembled half-sectional elevational view of the spherical diffraction crystal of FIG. 2.

FIG. 4 is a top view of the assembled spherical diffraction crystal of FIG. 3.

FIG. 5 is a schematic representation of a point focusing crystal monochromator employing the spherical diffraction crystal of FIGS. 2–4.

DESCRIPTION OF THE PREFERRED EMBODIMENT

Figure 1:
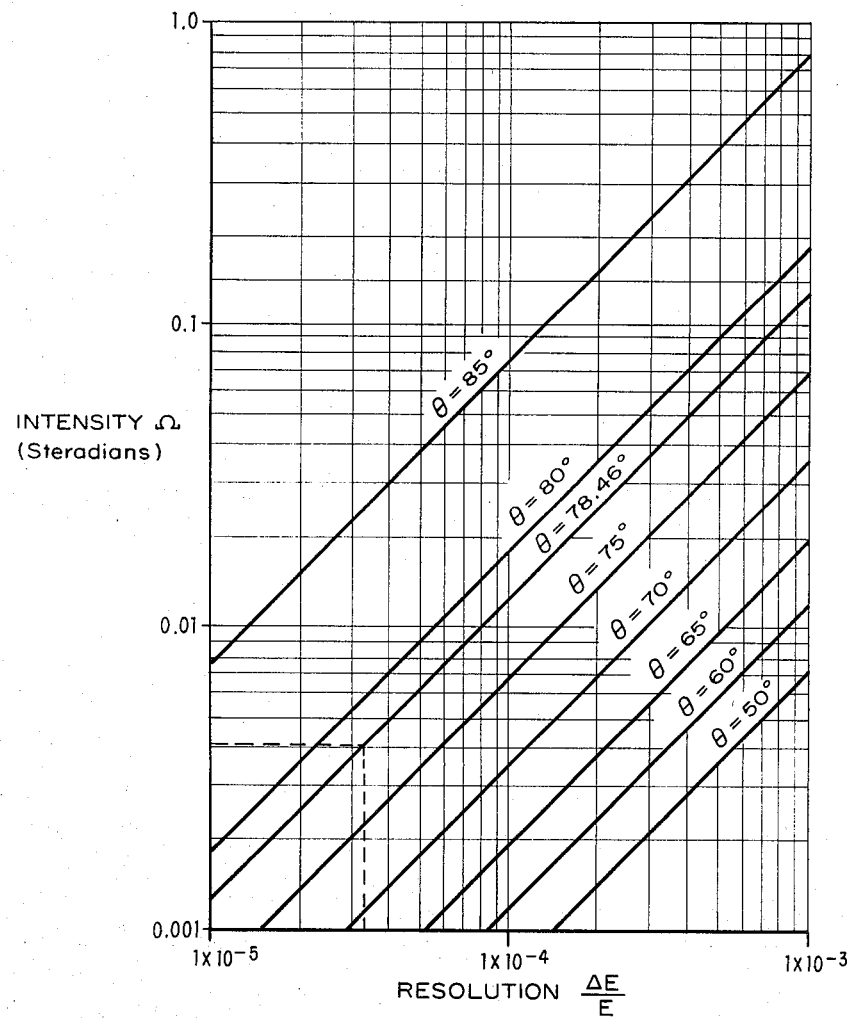
FIG. 1 is a logarithmic plot showing on the basis of the contribution of geometrical aberrations to line width the intensity, $\Omega$ and resolution, $\Delta E/E$, with which a spherical diffraction crystal fabricated in accordance with the principles of this invention may theoretically be expected to focus X-radiation for different Bragg angles, $\theta$ in the range from 50° to 90°. The intensity, $\Omega$ is given in steradians because intensity is directly proportional to the solid angle subtended by the spherical diffraction crystal as seen from an X-ray source located at a point on the Rowland circle.

Referring to FIG. 1, there are shown for different Bragg angles, $\theta$ in the range from 50° to 90° different values of intensity, $\Omega$, and resolution, $\Delta E/E$, that on the basis of the contribution of geometrical aberrations to line width may theoretically be obtained by employing a spherical diffraction crystal to focus X-radiation from a source at a point on the Rowland circle onto a target at a conjugate point on the Rowland circle. It may be seen that for a given Bragg angle the intensity decreases with increasing resolution. This occurs because the resolution is increased by reducing aberrations and hence by reducing the solid angle subtended by the spherical diffraction crystal as seen from the X-ray source, whereas the intensity is decreased by reducing the solid angle subtended by the spherical diffraction crystal as seen from the X-ray source. It is therefore apparent that insofar as practical, it is normally preferable in most applications to employ the largest possible spherical diffraction crystal that will give the required resolution.

For purposes of illustration, it will now be described in accordance with the preferred embodiment of this inventon how for a Bragg angle of 78.46° a spherical diffraction crystal may be fabricated that on the basis of the contribution of geometrical aberrations to line width may theoretically be expected to focus X-radiation with the intensity and resolution indicated by the dashed lines in FIG. 1. As indicated with the aid of FIG. 2, this spherical diffraction crystal is fabricated by forming a thin y-cut (01·0) crystalline quartz disc 10 having flat surfaces 12 and 14 parallel within less than a minute and preferably only a few seconds to the atomic planes of the quartz disc. The quartz disc 10 should have a diameter, $D_d$, about an order of magnitude less than the diameter, $D_R$, of the Rowland circle (that is, it should have an f number of about ten where $f = D_R/D_d$). It should also have a thickness, $t_d$ of at least two orders of magnitude less than the radius, $R_R$, of the Rowland circle. For example, in the case of a Rowland circle with a desired radius, $R_R$ of 6 inches, a quartz disc 10 having a diameter of about 1 inch and a thickness of about 0.003–0.010 inch (preferably about 0.006 inch) may be employed. The quartz disc 10 may be formed by cutting it from a body of natural or synthetic crystalline quartz stock (Z growth synthetic quartz being preferred because of its greater uniformity) and lapping or otherwise grinding it to obtain the required thickness and the required parallelism between the surfaces 12 and 14 and the atomic planes of the disc.

An x-cut (10·0) crystalline quartz substrate 16 having substantially the same thermal coefficient of expansion as the crystalline quartz disc 10 is formed with a spherical surface 18 having a radius of curvature substantially equal to the diameter, $D_R$, of the Rowland circle. The quartz substrate 16 should have a diameter, $D_s$, greater than that of the quartz disc 10 and should have a thickness, $t_s$, at least an order of magnitude greater than that of the quartz disc. In the case of a Rowland circle and a quartz disc 10 with the dimensions set forth above, a quartz substrate 16 having a diameter of about 0.050–0.100 inch more than that of the quartz disc, a thickness of about one-half inch, and a spherical surface 18 with a radius of curvature of about twelve inches is preferably employed. The quartz substrate 16 may also be formed by cutting it from a body of natural or synthetic crystalline quartz stock and grinding it to obtain the required spherical surface 18.

The spherical surface 18 of quartz substrate 16 and the adjoining flat surface 14 of quartz disc 10 are plated with a brazing material 20 such as an alloy of 45 per cent tin and 55 per cent gold. This may be done, for example, by masking the remaining surfaces of the quartz disc 10 and the quartz substrate 16 and by vacuum depositing the brazing material 20 to a depth of about 2,000 Angstroms on the exposed surfaces 14 and 18. As indicated with the aid of FIGS. 3 and 4, the quartz disc 10 is forced against the quartz substrate 16 with the z axes of the quartz disc and the quartz substrate aligned and with the plated lower surface 14 of the quartz disc in continuous abutment upon the plated spherical surface 18 of the quartz substrate. This may be done by aligning the z axes of the quartz disc 10 and the quartz substrate 16 in an evacuated enclosure with the upper surface 12 of the quartz disc abutting upon one side of a resilient diaphragm and then applying gradually increasing gas pressure to the other side of the resilient diaphragm until the plated surface 14 of the quartz disc spherically bends into continuous abutment with the plated spherical surface 18 of the quartz substrate (a pressure of about 35 psi is required for a quartz disc and a quartz substrate with the dimensions set forth above). The spherically bent quartz disc 10 is brazed in place on the plated spherical surface 18 of the quartz substrate 16 by heating the quartz disc and the quartz substrate to a temperature above the melting point of the brazing material 20 but below the point of damaging the quartz. For the above-mentioned tin-gold alloy of this temperature is about four hundred degrees Centigrade. Gas pressure is continuously applied through the resilient diaphragm to the upper surface 12 of the spherically bent quartz disc 10 until the melted brazing material 20 has had sufficient time to cool and solidify thereby bonding the spherically bent quartz disc in place on the plated spherical surface 18 of quartz substrate 16.

If the z axes of the spherically bent quartz disc 10 and the quartz substrate 16 are misaligned, a stress is placed on the spherically bent quartz disc as the spherically bent quartz disc and the quartz substrate cool from the solidification temperature of the brazing material 20 down to room temperature. This stress increases with the misalignment angle of the z axes and with the solidification temperature of the brazing material 20 and may become sufficiently large to fracture the spherically bent diffraction crystal 10. For example, in the case of the above-mentioned tin-gold alloy, a spherically bent quartz disc 10 and a quartz substrate 16 with the dimensions and structure set forth above must have their z axes aligned within less than thirty degrees to reliably prevent the spherically bent quartz disc from fracturing.

These steps provide a spherically bent diffraction crystal 10 with concentric spherical surfaces and atomic layers each having a radius of curvature substantially equal to the diameter, $D_R$, of the Rowland circle. For purposes of this specification and the claims appended hereto, a radius of curvature is considered to be substantially equal to the diameter, $D_R$, of the Rowland circle if it differs from $D_R$ by an amount on the order of or less than the thickness, $t_d$, the diffraction crystal 10. The spherically bent diffraction crystal 10 may be employed, for example, to provide an improved point focusing crystal monochromator for use in an X-ray spectrometer or an ESCA system for studying the chemical composition of a selected sample. X-ray spectrometers of the type in which such a point focusing crystal monochromator may be used to advantage are well known. For example, see FIG. 1 of U.S. Pat. No. 3,321,624 issued on May 23, 1967, to Seigo Kishino et al. ESCA systems of the type in which such a point focusing crystal monochromator may be used to advantage are shown and described on pages 171–173 of the book ESCA written by Kai Siegbahn et al and published in December, 1967, by Almqvist and Wicksells Boktryckeri AB and in copending U.S. Pat. Application Ser. No. 854,437 entitled *ELECTRON SPECTROSCOPY SYSTEM WITH A MULTIPLE ELECTRODE ELECTRON LENS*, filed on Sept. 2, 1969, by Kai Siegbahn et al., issued as U. S. Pat. No. 3,617,741 on Nov. 2, 1971, and assigned to the same assignee as this application.

As indicated in FIG. 4, the improved point focusing crystal monochromator is provided by employing an X-ray source 22 (comprising an active X-radiating element and/or a passive defining slit) mounted for directing a characteristic X-ray line toward the spherically bent diffraction crystal 10 where the angle $\theta$ satisfies the condition for Bragg diffraction. This condition is 2d $\sin\theta = n\lambda$, where d is the lattice spacing of the quartz disc 10, $\theta$ is the Bragg angle (the angle between the central ray of the characteristic X-ray line impinging on the crystal monochromator and a tangent to the Rowland circle at the point of incidence of the central ray), n is the order of diffraction, and $\lambda$ is the wavelength of the characteristic X-ray line, For and Alk$\alpha$ X-ray source 22 of E = 1.487Kev ($\lambda$ = 8.3205A) and a spherically bent diffraction crystal 10 with the structure and dimensions set forth above, the Bragg angle $\theta$ is 78.46° for first order diffraction (n = 1). The spherically bent diffraction crystal 100 monochromatically focuses the characteristic X-ray line on the Rowland circle at the mirror image (a conjugate) of the point from which the characteristic X-ray line is directed toward the spherically bent diffraction crystal. For the type of X-ray point source 22 and the geometry of the monochromator set forth above, a spherically bent diffraction crystal 10 with the structure and dimensions set forth above will focus X-radiation at a location about 0.002 inch long on the Rowland circle. The contribution of geometrical aberrations to the line width of the X-radiation focused by such a spherically bent diffraction crystal is about $\Delta E = 0.05$eV. For the X-ray source 22 set forth above this corresponds to the resolution, $\Delta E/E$, indicated by the vertical dashed line in FIG. 1. Concomitantly, the intensity, $\Omega$ with which X-radiation is focused by such a spherically bent diffraction crystal corresponds to that indicated by the horizontal dashed line in FIG. 1.

A target 24 is mounted at the focal point of the spherically bent diffraction crystal 10. In the case of an X-ray spectrometer the target comprises a detector (for example, a defining slit and/or a photographic plate) since the X-ray source 22 comprises the sample under study. However, in the case of an ESCA system as indicated in FIG. 4, the target 24 comprises the sample under study and/or a defining slit. Irradiation of the sample 24 by the characteristic X-ray line causes the sample to emit photoelectrons. An electron spectrometer such as one of those disclosed in the book ESCA or the above-mentioned patent application is employed for analyzing this photoelectron emission to determine the chemical composition of the sample 24.

We claim:

1. Crystal diffraction apparatus comprising:
a cyrstalline substrate having a concave spherical surface; and
a crystalline diffracting element bent in conformity with and bonded to the concave spherical surface of the crystalline substrate to provide a crystalline diffracting element having a concave spherical outer surface, said crystalline substrate and said crystalline diffracting element having substantially the same thermal coefficients of expansion and having their Z-axes aligned within less than 30°.

2. Crystal diffraction apparatus as in claim 1 wherein:
said crystalline substrate comprises a crystalline quartz substrate, the spherical surface of said crystalline quartz substrate having a radius of curvature substantially equal to the diameter of the Rowland circle; and
said crystalline diffracting element comprises a crystalline quartz disc having flat surfaces parallel to its atomic planes, said crystalline quartz disc being spherically bent in conformity with and bonded to the spherical surface of the crystalline quartz substrate to provide a crystalline quartz diffracting element having a spherical outer surface with a radius of curvature substantially equal to the diameter of the Rowland circle.

3. Crystal diffraction apparatus as in claim 2 wherein:
said crystalline quartz substrate is x-cut;
said crystalline quartz disc is y-cut; and
the z-axes of said x-cut crystalline quartz substrate and said y-cut crystalline quartz disc are aligned within less than 12°.

4. Crystal diffraction apparatus as in claim 3 wherein said crystalline quartz disc is capable of diffracting X-radiation at a Bragg angle in the range from 50° to 90°, has a thickness at least two orders of magnitude less than the radius of the Rowland circle, and has a diameter at least an order of magnitude less than the diameter of the Rowland circle.

5. Crystal diffraction apparatus as in claim 1 including:
source means for directing X-radiation toward the spherical outer surface of the crystalline diffracting element from a location on the Rowland circle where the condition for Bragg diffraction is satisfied, said crystalline diffracting element serving to focus this X-radiation at a conjugate location on the Rowland circle; and
target means for receiving the X-radiation focused at the conjugate location on the Rowland circle.

6. Crystal diffraction apparatus as in claim 5 wherein said source means is positioned at a location on the Rowland circle for which the central ray of the X-radiation incident on the spherical outer surface of the crystalline diffracting element makes an angle in the range from 50° to 90° with respect to a tangent to the Rowland circle at the point of incidence of the central ray.

7. A method of fabricating a diffraction crystal, said method comprising the steps of:
forming a crystalline substrate having a concave spherical surface;
forming a crystalline diffracting element having substantially the same thermal coefficient of expansion as the crystalline substrate and having a pair of generally flat surfaces parallel to its atomic planes;
aligning the Z-axes of the cystalline substrate and the crystalline diffracting element within less than 30°;
forcing the cystalline diffracting element against the concave spherical surface of the crystalline substrate; and
bonding the crystalline diffracting element in place on the concave spherical surface of the crystalline substrate to provide a crystalline diffracting element having a spherical outer surface.

8. A method as in claim 7 wherein:
said first-mentioned forming step comprises forming a crystalline quartz substrate having a concave spherical surface with a radius of curvature substantially equal to the diameter of the Rowland circle; and
said second-mentioned forming step comprises forming a crystalline quartz disc having a pair of generally flat surfaces parallel to its atomic planes and having a thickness at least two orders of magnitude less than the radius of the Rowland circle.

9. A method as in claim 8 wherein said second-mentioned forming step comprises forming a crystalline quartz disc capable of diffracting X-radiation at a Bragg angle in the range from fifty to ninety degrees.

10. A method as in claim 9 wherein:
   said first-mentioned forming step comprises forming and x-cut crystalline quartz substrate having a concave spherical surface with a radius of curvature substantially equal to the diameter of the Rowland circle;
   said second-mentioned forming step comprises forming a y-cut crystalline quartz disc having a diameter at least an order of magnitude less than the diameter of the Rowland circle; and
   said aligning, forcing and bonding steps comprise plating the concave spherical surface of the crystalline quartz substrate and the adjoining surface of the crystalline quartz disc with a brazing material, aligning the z-axes of the crystalline quartz disc and the crystalline quartz substrate within an angle less than 12°, applying uniform pressure to another surface of the crystalline quartz disc to force the plated surface of the crystalline quartz disc in continuous abutment upon the plated concave spherical surface of the crystalline quartz substrate, heating the plated brazing material above its melting point but below the point of damamge to the crystalline quartz disc and substrate, and cooling the melted brazing material below its solidification temperature to bond the crystalline quartz disc in place on the concave spherical surface of the crystalline quartz substrate to provide a spherically bent crystalline quartz disc with a spherical outer surface.

* * * * *